United States Patent
Swann

(10) Patent No.: US 6,237,942 B1
(45) Date of Patent: May 29, 2001

(54) INFLATABLE VEHICLE OCCUPANT PROTECTION DEVICE

(75) Inventor: Timothy A. Swann, Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/616,397

(22) Filed: Jul. 14, 2000

(51) Int. Cl.⁷ .................................................. B60R 21/22
(52) U.S. Cl. .................. 280/730.2; 280/729; 280/743.1
(58) Field of Search ........................ 280/728.1, 728.2, 280/729, 730.1, 730.2, 743.1, 743.2, 748, 749, 733

(56) References Cited

U.S. PATENT DOCUMENTS

| | | | |
|---|---|---|---|
| 3,866,940 | * 2/1975 | Lewis | 280/733 |
| 3,888,503 | * 6/1975 | Hamilton | 280/733 |
| 5,322,322 | 6/1994 | Bark et al. | |
| 5,421,128 | * 6/1995 | Sharpless et al. | 52/2.13 |
| 5,464,246 | * 11/1995 | Castro et al. | 280/730.2 |
| 5,480,181 | 1/1996 | Bark et al. | |
| 5,941,564 | 8/1999 | Acker | |
| 6,112,634 | * 9/2000 | Head | 87/13 |

* cited by examiner

Primary Examiner—Brian L. Johnson
Assistant Examiner—Faye M. Fleming
(74) Attorney, Agent, or Firm—Tarolli, Sundheim, Covell, Tummino & Szabo L.L.P.

(57) ABSTRACT

Apparatus (10) for helping to protect an occupant of a vehicle (12) includes an inflatable tubular structure (14) that is inflatable into a position adjacent a vehicle occupant. An inflation fluid source (22) provides inflation fluid for inflating the inflatable tubular structure. The inflatable tubular structure (14) includes an inflatable bladder (50) and a tubular outer shell (52) that surrounds the inflatable bladder. The outer shell (52) has a length and a diameter and includes a plurality of slits (60) that extend longitudinally along the outer shell in a direction generally parallel to the length of the outer shell. The diameter of the outer shell (52) increases and the length of the outer shell decreases when the inflatable bladder (50) is inflated.

24 Claims, 5 Drawing Sheets

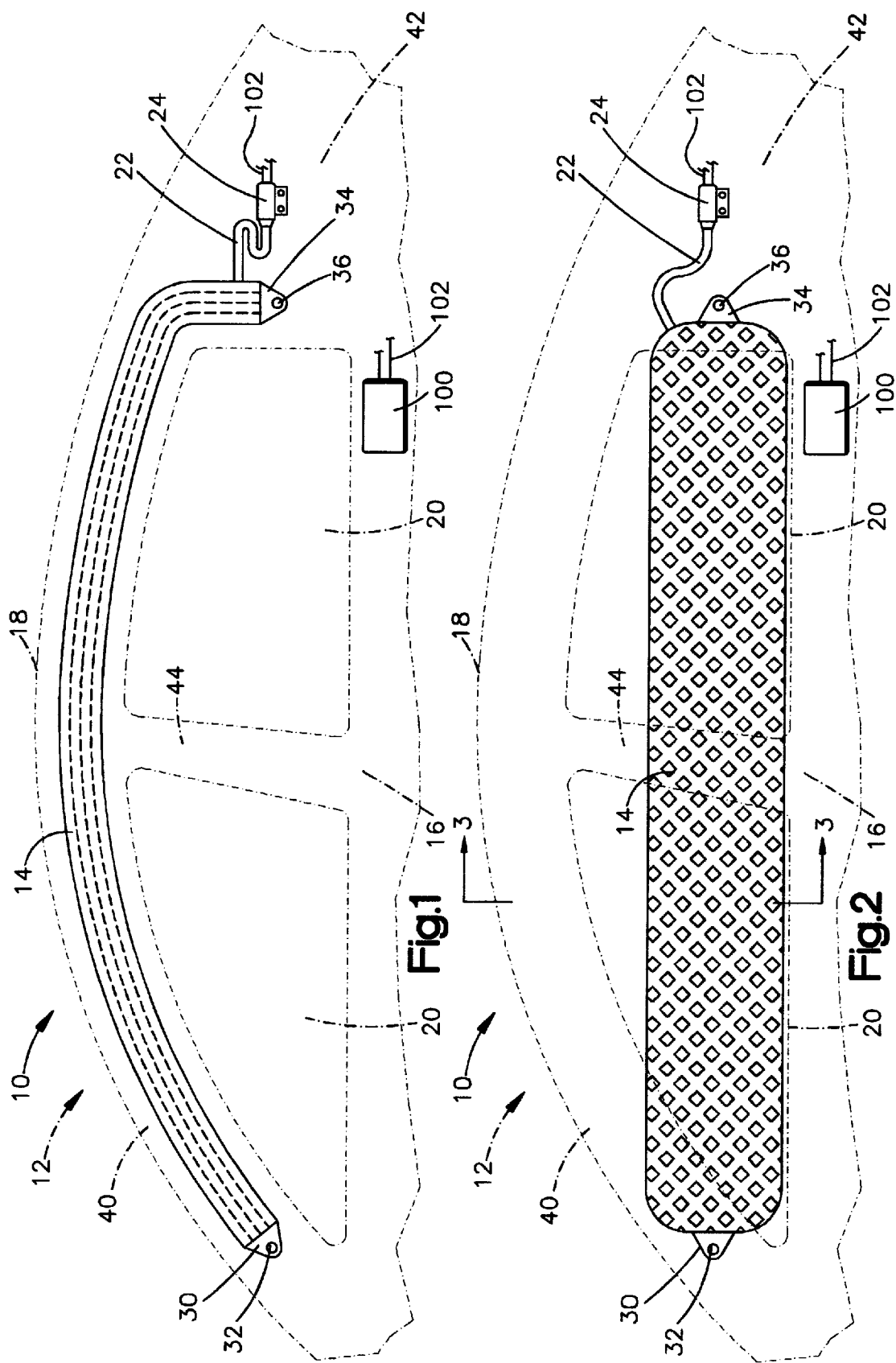

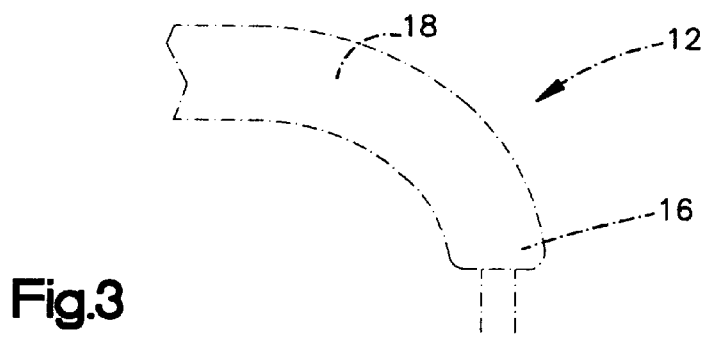
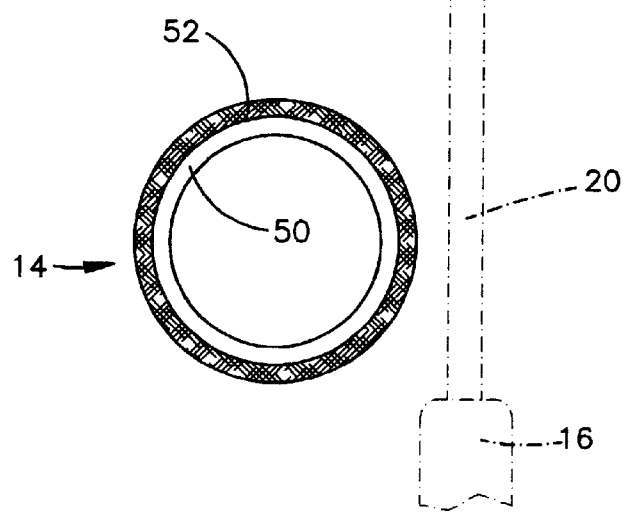
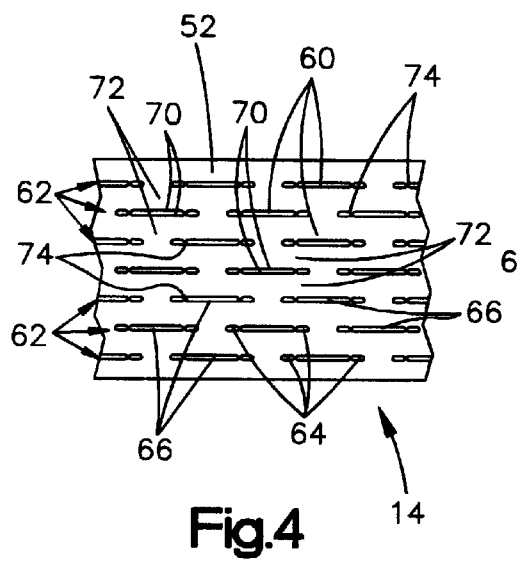
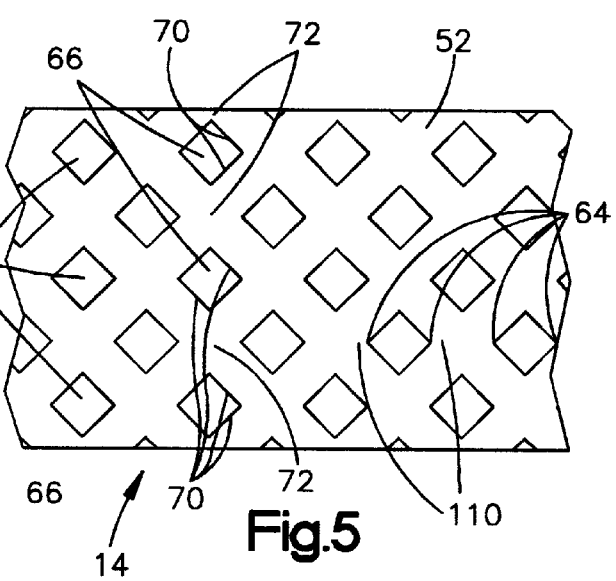

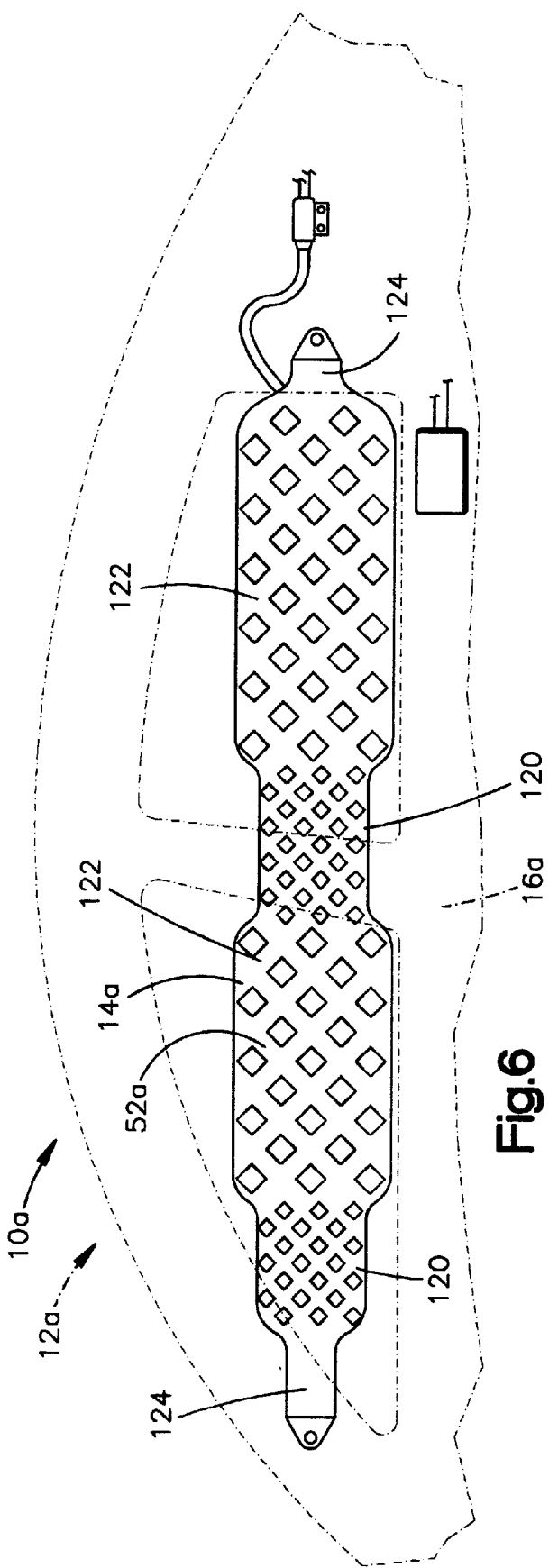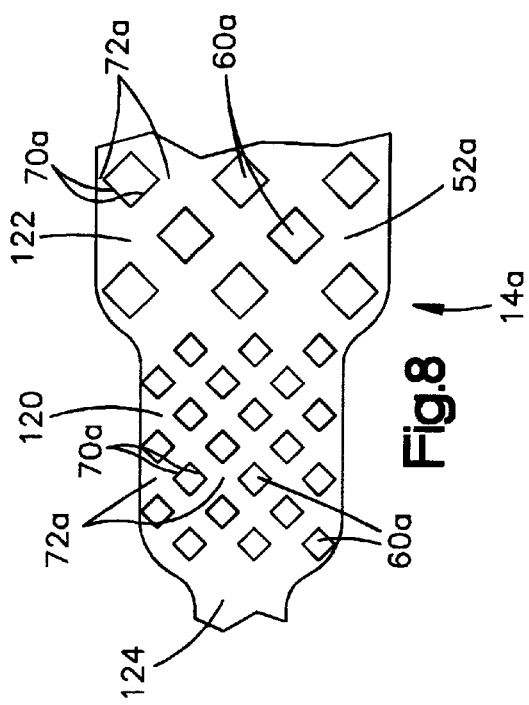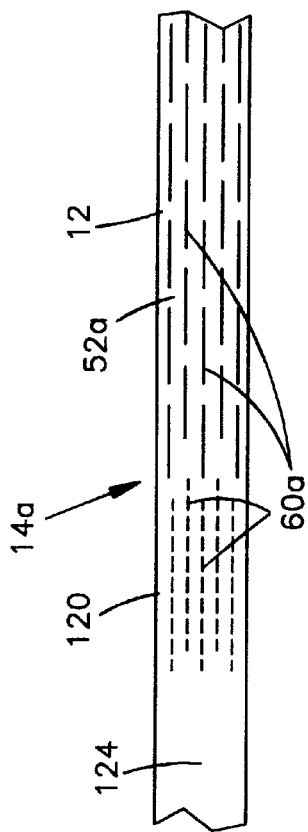

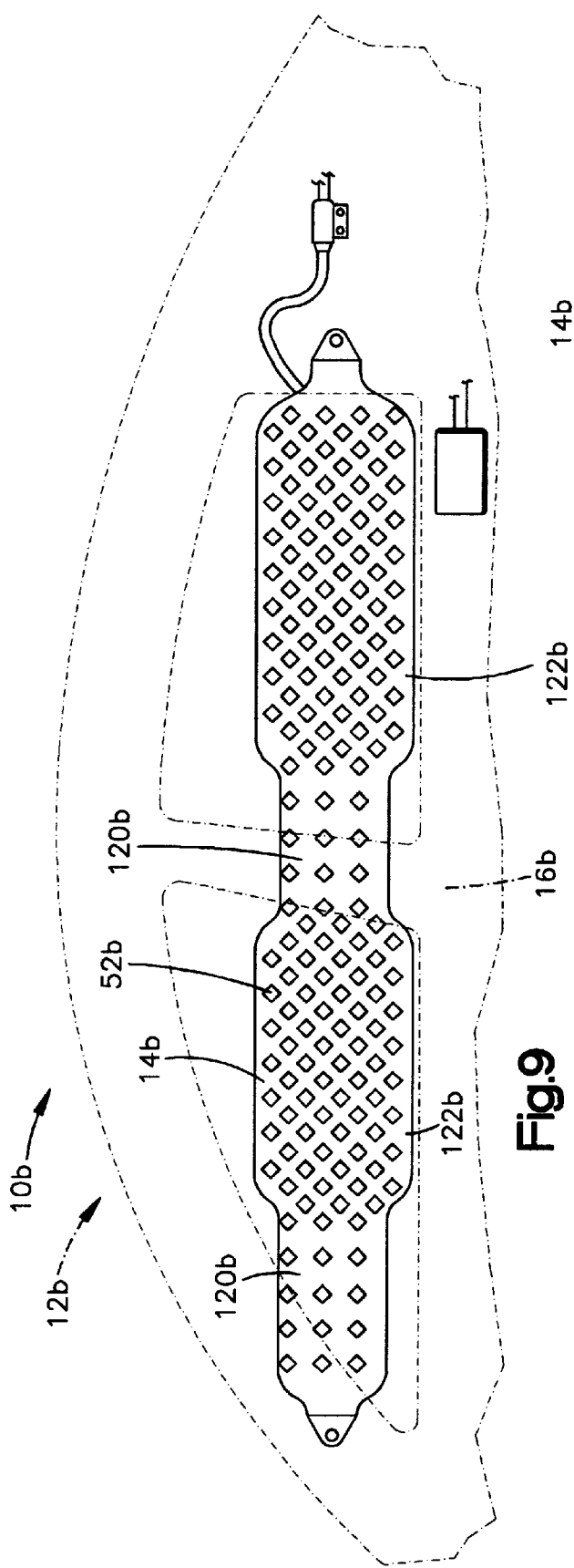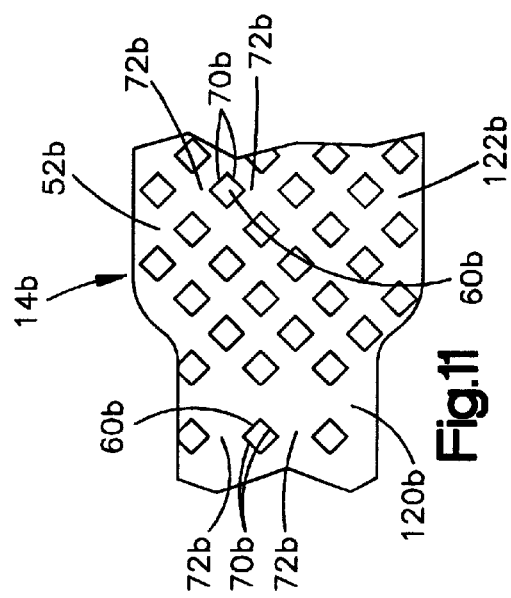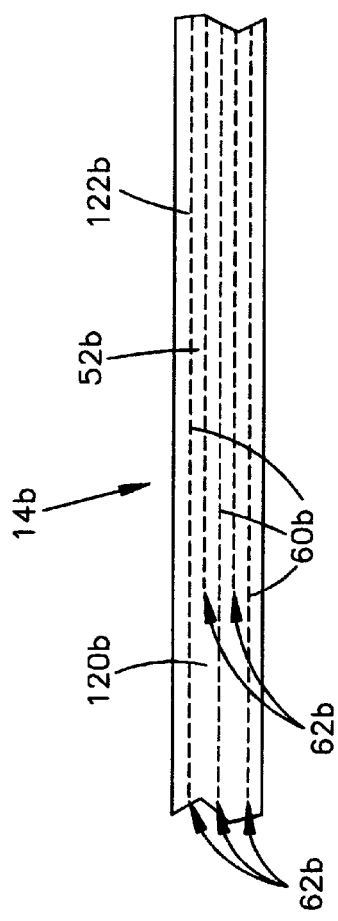

INFLATABLE VEHICLE OCCUPANT PROTECTION DEVICE

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable tubular structure that inflates from the roof of the vehicle downward inside the passenger compartment between a vehicle occupant and the side structure of the vehicle in the event of a side impact or rollover. A known inflatable tubular structure is inflated from a deflated condition by inflation fluid directed from an inflator to the inflatable tube structure through a fill tube.

SUMMARY OF THE INVENTION

The present invention relates to an apparatus for helping to protect an occupant of a vehicle. The apparatus comprises an inflatable tubular structure that is inflatable into a position adjacent a vehicle occupant, and an inflation fluid source that provides inflation fluid for inflating the inflatable tubular structure. The inflatable tubular structure includes an inflatable bladder and a tubular outer shell that surrounds the inflatable bladder. The outer shell has a length and a diameter and includes a plurality of slits that extend longitudinally along the outer shell in a direction generally parallel to the length of the outer shell. The diameter of the outer shell increases and the length of the outer shell decreases when the inflatable bladder is inflated.

The present invention also relates to an apparatus in which the inflatable tubular structure comprises an inflatable bladder and a tubular outer shell that surrounds said inflatable bladder. The outer shell is constructed of a braided material and includes at least one first portion and at least one second portion. The braided material of the first portion is more tightly braided than the braided material of the second portion. The first portion has a first diameter when the inflatable tubular structure is inflated. The second portion has a second diameter, greater than the first diameter, when the inflatable tubular structure is inflated.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable apparatus for helping to protect an occupant of a vehicle according to a first embodiment of the present invention illustrating the apparatus in a deflated condition;

FIG. 2 is a schematic view of the apparatus of FIG. 1 in an inflated condition;

FIG. 3 is a sectional view of the apparatus of FIG. 2 taken generally along line 3—3 in FIG. 2;

FIG. 4 is a schematic view of a portion of the apparatus of FIG. 1 in a deflated condition;

FIG. 5 is a schematic view of the portion of the apparatus of FIG. 4 in an inflated condition;

FIG. 6 is a schematic view of an apparatus for helping to protect an occupant of a vehicle according to a second embodiment of the invention;

FIG. 7 is a schematic view of a portion of the apparatus of FIG. 6 in a deflated condition;

FIG. 8 is a schematic view of the portion of the apparatus of FIG. 7 in an inflated condition;

FIG. 9 is a schematic view of an apparatus for helping to protect an occupant of a vehicle according to a third embodiment of the invention;

FIG. 10 is a schematic view of a portion of the apparatus of FIG. 9 in a deflated condition;

FIG. 11 is a schematic view of the portion of the apparatus of FIG. 10 in an inflated condition;

DESCRIPTION OF PREFERRED EMBODIMENTS

Figure 12:
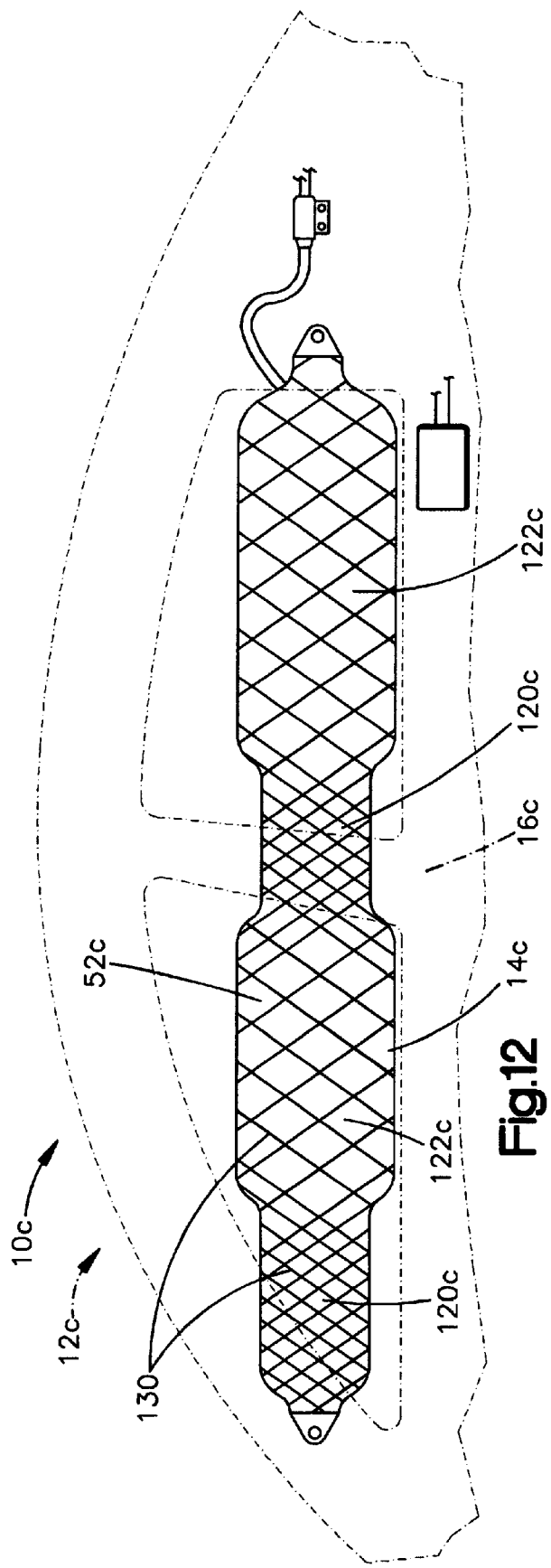
FIG. 12 is a schematic view of an apparatus for helping to protect an occupant of a vehicle according to a fourth embodiment of the invention.

As representative of the present invention, an apparatus 10 helps to protect an occupant of a vehicle 12. As shown in FIGS. 1 and 2, the apparatus 10 includes an inflatable vehicle occupant protection device in the form of an inflatable tubular structure 14 that is mounted adjacent the side structure 16 of the vehicle 12 and a roof 18 of the vehicle. The side structure 16 of the vehicle 12 includes side windows 20. An inflator 24 is connected in fluid communication with the inflatable tubular structure 14 through a fill tube 22. The inflator 24 could alternatively be connected directly to the inflatable tubular structure 14, in which case the fill tube 22 would be omitted.

The inflator 24 contains a stored quantity of pressurized inflation fluid (not shown) in the form of a gas to inflate the inflatable tubular structure 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable tubular structure 14.

The inflatable tubular structure 14 has a first end 30 connected to the side structure 16 of the vehicle 12 at a first location 32 and an opposite second end 34 connected to the side structure at a second location 36. As illustrated in FIGS. 1 and 2, the first location 32 may be on or near an A pillar 40 of the vehicle 12, and the second location 36 may be on or near a C pillar 42 of the vehicle. The inflatable tubular structure 14 has a stored condition (FIG. 1) in which the inflatable tubular structure is deflated and extends along the vehicle roof 18 and along the side structure 16 of the vehicle 12 above the side windows 20.

As illustrated in FIG. 3, the inflatable tubular structure 14 comprises an inflatable bladder 50 and a generally tubular outer shell 52 that surrounds the inflatable bladder. The inflatable bladder 50 is preferably constructed of a material, such as an elastic polymer, that is generally gas impermeable and that is capable of expanding and conforming to the size and shape of the outer shell 52. The fill tube (not shown in FIG. 3) is in fluid communication with the inflatable bladder 50.

The outer shell 52 is constructed of a material, such as a plastic, that is generally flexible and bendable, but not readily stretchable. The outer shell 52 is preferably formed of a seamless single piece of homogeneous material. The outer shell 52 could, however, have alternative constructions. For example, the outer shell 52 could be formed from a sheet of material that is folded or rolled to form the tubular shape of the outer shell. overlapping portions of the sheet of material could then be secured together by known means, such as stitching, ultrasonic bonding, heat welding, or adhesive bonding.

As best illustrated in FIG. 4, the outer shell 52 includes a plurality of slits 60 that extend along the length of the outer shell in a direction generally parallel to the length of the shell. The slits 60 are arranged in a plurality of parallel rows 62 in which the slits are spaced apart end-to-end along the length of the outer shell 52. The rows 62 are arranged such that the slits 60 in any given row are positioned in an offset or staggered manner with respect to the slits in adjacent rows. Thus, end portions 64 of any given slit 60 are positioned adjacent to middle portions 66 of slits 60 in adjacent rows 62.

In the embodiment illustrated in FIGS. 1–5, the slits 60 are generally equal in length. Each slit 60 is preferably between one-eighth and one inch long. The slits 60 are preferably spaced between one-eighth and one inch apart along each of the rows 62. The rows 62 are preferably spaced between one-eighth and one inch apart from each other.

Each slit 60 includes generally parallel edges 70 that extend between the end portions 64 of the slit. The slits 60 define portions 72 of the outer shell 52 positioned on opposite sides of the slit adjacent the edges 70 of the slit. When the inflatable tubular structure 14 is in the deflated condition of FIG. 4, the portions 72 are positioned adjacent to each other. When the inflatable tubular structure 14 is in the inflated condition of FIG. 5, the portions 72 are spaced apart from each other.

The outer shell may also include connections 74 that comprise portions of the outer shell 52 extending across the slits 60 and connecting the portions 72 on opposite sides of the slits. The connections 74 help to improve the structural integrity of the outer shell 52 and maintain the shape of the inflatable tubular structure 14 when the tubular structure is in the deflated condition.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the inflator 24 in response to the sensing of a side impact or a vehicle rollover.

In the event of a rollover of the vehicle 12 or a side impact to the vehicle of a magnitude greater than a predetermined threshold value, the sensor mechanism 100 provides an electrical signal over lead wires 102 to the inflator 24. The electrical signal causes the inflator 24 to be actuated in a known manner. The inflator 24 discharges fluid under pressure into the fill tube 22. The fill tube 22 directs the fluid into the inflatable tubular structure 14.

The inflatable tubular structure 14 inflates under the pressure of the inflation fluid from the inflator 24. The inflatable tubular structure 14 inflates away from the roof 18 in a downward direction as shown in the drawings and in a downward direction with respect to the direction of forward travel of the vehicle 12 into the position illustrated in FIG. 2.

The inflatable tubular structure 14 (FIG. 2), when inflated, extends along the side structure 16 of the vehicle 12 and is positioned between the side structure and any occupant of the vehicle. The inflatable tubular structure 14 extends between the A pillar 40 and the C pillar 42 of the vehicle 12 and overlies at least a portion of the A pillar, C pillar, and a B pillar 44 of the vehicle.

It will be recognized by those skilled in the art that the inflatable tubular structure may have alternative configurations. For example, in the illustrated embodiment, the inflatable tubular structure 14 extends between the A pillar 40 and the C pillar 42 of the vehicle 12. The inflatable tubular structure 14 could, however, extend between the A pillar 40 and the B pillar 44 only or between the B pillar and the C pillar 42 only. Also, in a vehicle having A, B, C, and D pillars (not shown), the inflatable tubular structure 14 could, when inflated, extend between the A pillar and the D pillar of the vehicle 12.

The inflatable tubular structure 14 could also be deployed into a position other than along the vehicle side structure 16. For example, the inflatable tubular structure 14, when inflated, could be located in front of a vehicle occupant, behind a vehicle occupant, or anywhere in the vehicle 12 adjacent a vehicle occupant where it is desirable to help protect the occupant.

When the inflatable tubular structure 14 is inflated from the deflated condition of FIG. 4 to the inflated condition of FIG. 5, the connections 74 are broken by pressure exerted on the outer shell 52 by the inflating bladder 50. As the inflatable tubular structure 14 is inflated, the diameter of the outer shell 52 increases and the length of the outer shell decreases. As the inflatable tubular structure is inflated, the portions 72 (FIG. 5) adjacent the middle portion 66 of each slit 60 move away from each other. The distance that the portions 72 move away from each other effectively increases the circumference of the outer shell 52, which increases the diameter of the shell. As the portions 72 move away from each other, portions 110 of the outer shell 52 between the end portions 64 of adjacent slits 60 move closer together, which causes the length of the outer shell to decrease.

When the inflatable tubular structure 14 is in the inflated condition, the slits 60 (FIG. 5) are illustrated as having a generally diamond shaped configuration in which the edges 70 and the end portions 64 form relatively sharp or pointed angles. Those skilled in the art, however, will recognize that the edges 70 and end portions 64 of the slits 60 may have a more curved configuration when the inflatable tubular structure 14 is in the inflated condition.

The degree to which the diameter of the outer shell 52 increases upon inflation of the inflatable tubular structure 14 varies according to the length of the slits 60. The greater the length of the slits 60, the greater the distance the portions 72 move away from each other upon inflation. Thus, an outer shell 52 having a given diameter when uninflated can be configured to inflate to a desired diameter by incorporating an appropriate number of slits 60, having an appropriate length, around the circumference of the outer shell.

As the inflatable tubular structure 14 is inflated and the length of the outer shell 52 begins to decrease, the inflatable tubular structure becomes tensioned between the first and second locations 32 and 36. This helps to move the inflatable tubular structure 14 from the stored position of FIG. 1 to the deployed position of FIG. 2 and also helps to maintain the inflatable tubular structure positioned adjacent the vehicle side structure 16 between the side structure and an occupant of the vehicle 12.

The inflatable tubular structure 14, when inflated, helps to protect a vehicle occupant in the event of a vehicle rollover or a side impact to the vehicle 12. The inflatable tubular structure 14, when inflated, helps to absorb the energy of impacts with the tubular structure and helps to distribute the impact energy over a large area of the tubular structure. When the inflatable tubular structure 14 is in the inflated and deployed condition illustrated in FIG. 2, portions of the inflatable tubular structure may be positioned adjacent the vehicle side structure 16 at a location where an occupant's head is likely to strike the side structure in the event of a side impact or vehicle rollover.

A second embodiment of the present invention is illustrated in FIGS. 6–8. The second embodiment of the invention is similar to the first embodiment of the invention illustrated in FIGS. 1–5. Accordingly, numerals similar to those of FIGS. 1–5 will be utilized in FIGS. 6–8 to identify similar components, the suffix letter "a" being associated with the numerals of FIGS. 6–8 to avoid confusion. The apparatus 10a (FIGS. 6–8) of the second embodiment is identical to the apparatus 10 (FIGS. 1–5), except for the outer shell 52a. The outer shell 52a (FIGS. 6–8) of the second embodiment has a varying diameter along the length of the outer shell instead of the generally uniform diameter of the outer shell 52 of the first embodiment (FIGS. 1–5).

As illustrated in FIG. 6, the outer shell 52a of the inflatable tubular structure 14a includes two first portions 120, two second portions 122, and two third portions 124. The first portions 120 of the outer shell 52a have a first diameter when the inflatable tubular structure 14a is inflated. The second portions 122 of the outer shell 52a have a second diameter, greater than the first diameter, when the inflatable tubular structure 14a is inflated.

The slits 60a in the first and second portions 120 and 122 have lengths preferably between one-eighth and one inch. As best illustrated in FIG. 7, the slits 60a in the second portions 122 of the outer shell 52a are longer than the slits in the first portions 120 of the shell.

When the inflatable tubular structure 14a is inflated from the deflated condition of FIG. 7 to the inflated condition of FIG. 8, the portions 72a adjacent the edges 70a of the slits 60a in the second portions 122 of the outer shell 52a move farther away from each other than the portions 70a adjacent the edges of the slits in the first portions 120 of the shell. This causes the second portions 122 of the outer shell 52a to have an inflated diameter that is greater than the inflated diameter of the first portions 120 of the outer shell.

The third portions 124 of the outer shell 52a do not include any slits. Thus, the diameters of the third portions 124 of the outer shell 52a do not increase when the inflatable tubular structure 14a is inflated.

The inflatable tubular structure 14a, when inflated, helps to protect a vehicle occupant in the event of a vehicle rollover or a side impact to the vehicle 12a. The inflatable tubular structure 14a, when inflated, helps to absorb the energy of impacts with the tubular structure and helps to distribute the impact energy over a large area of the tubular structure. When the inflatable tubular structure 14a is in the inflated and deployed condition illustrated in FIG. 6, the second portions 122 may be positioned adjacent the vehicle side structure 16a at a location where an occupant's head is likely to strike the side structure in the event of a side impact or vehicle rollover.

A third embodiment of the present invention is illustrated in FIGS. 9–11. The third embodiment of the invention is similar to the second embodiment of the invention illustrated in FIGS. 6–8. Accordingly, numerals similar to those of FIGS. 6–8 will be utilized in FIGS. 9–11 to identify similar components, the suffix letter "b" being associated with the numerals of FIGS. 9–11 to avoid confusion. The apparatus 10b (FIGS. 9–11) of the third embodiment is identical to the apparatus 10a (FIGS. 6–8), except that the outer shell 52b (FIGS. 9–11) of the third embodiment has a different construction than the outer shell 52a of the second embodiment (FIGS. 6–8).

As illustrated in FIG. 9, the outer shell 52b of the inflatable tubular structure 14b includes two first portions 120b and two second portions 122b. The first portions 120b of the outer shell 52b have a first diameter when the inflatable tubular structure 14b is inflated. The second portions 122b of the outer shell 52b have a second diameter, greater than the first diameter, when the inflatable tubular structure 14b is inflated.

The slits 60b in the first and second portions 120b and 122b have generally equal lengths, preferably between one-eighth and one inch. As best illustrated in FIG. 10, the number of slits 60b per unit area in the second portions 122b of the outer shell 52b is greater than the number of slits per unit area in the first portions 120a of the outer shell. The second portions 122b may also include a greater number of rows 62b of slits 60b.

When the inflatable tubular structure 14b is inflated from the deflated condition of FIG. 10 to the inflated condition of FIG. 11, the portions 72b adjacent the edges 70b of the slits 60b in the first and second portions 120b and 122b of the outer shell 52b move away from each other a distance generally equal to each other. Nonetheless, the second portions 122b of the outer shell 52b have an inflated diameter that is greater than the inflated diameter of the first portions 120b of the outer shell. This is because there is a greater number of slits 60b per unit area in the second portion 122b than in the first portion 120b.

The inflatable tubular structure 14b, when inflated, helps to protect a vehicle occupant in the event of a vehicle rollover or a side impact to the vehicle 12b. The inflatable tubular structure 14b, when inflated, helps to absorb the energy of impacts with the tubular structure and helps to distribute the impact energy over a large area of the tubular structure. When the inflatable tubular structure 14b is in the inflated and deployed condition illustrated in FIG. 9, the second portions 122b may be positioned adjacent the vehicle side structure 16b at a location where an occupant's head is likely to strike the side structure in the event of a side impact or vehicle rollover.

Figure 14:
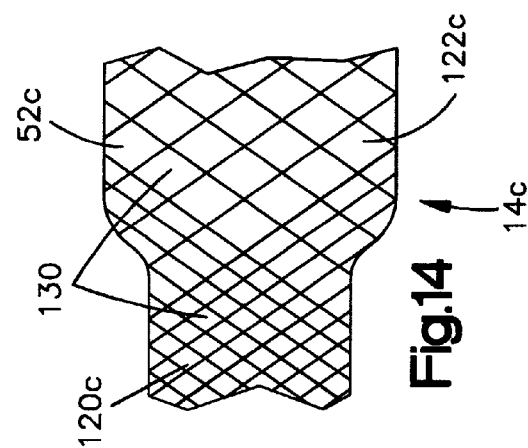
FIG. 14 is a schematic view of the portion of the apparatus of FIG. 13 in an inflated condition.
Figure 13:
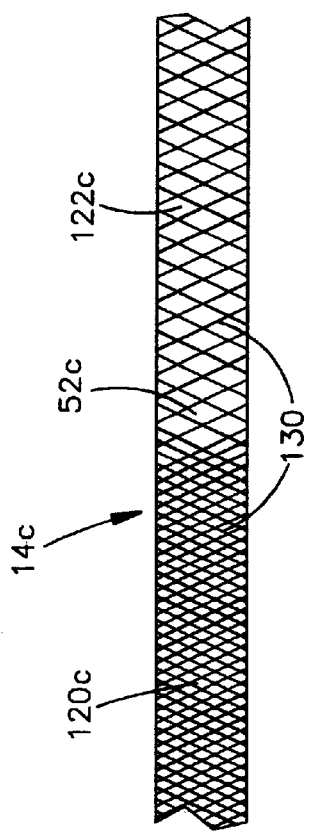
FIG. 13 is a schematic view of a portion of the apparatus of FIG. 12 in a deflated condition.

A fourth embodiment of the present invention is illustrated in FIGS. 12–14. The fourth embodiment of the invention is similar to the third embodiment of the invention illustrated in FIGS. 9–11. Accordingly, numerals similar to those of FIGS. 9–11 will be utilized in FIGS. 12–14 to identify similar components, the suffix letter "c" being associated with the numerals of FIGS. 12–14 to avoid confusion. The apparatus 10c (FIGS. 12–14) of the fourth embodiment is identical to the apparatus 10b (FIGS. 9–11), except that the outer shell 52c (FIGS. 12–14) of the fourth embodiment has a different construction than the outer shell 52b of the third embodiment (FIGS. 9–11).

The outer shell 52c of the third embodiment is constructed of a braided material, such as fabric, in which strands 130 of material are interwoven to form the outer shell. As illustrated in FIG. 12, the outer shell 52c of the inflatable tubular structure 14c includes two first portions 120c and two second portions 122c. The first portions 120c of the outer shell 52c have a first diameter when the inflatable tubular structure 14c is inflated. The second portions 122c of the outer shell 52c have a second diameter, greater than the first diameter, when the inflatable tubular structure 14c is inflated.

As illustrated in FIGS. 13 and 14, the material used to construct the first portions 120c of the outer shell 52c is more tightly braided than the material used to construct the second portions 122c. In other words, the strands 130 of material that are braided together to form the first portions 120c of the outer shell 52c are interwoven more tightly and closely than strands of material that are braided together to form the second portions 122c of the outer shell 52c. As a result, the first portions 120c are braided relatively tightly, whereas the second portions 122c are braided relatively loosely.

When the inflatable tubular structure 14c is inflated from the deflated condition of FIG. 13 to the inflated condition of FIG. 14, the first portions 120c inflate to a first diameter and the second portions 122c inflate to a second diameter, greater than the first diameter. This is because the generally tight braiding of the first portions 120c helps to restrict radial expansion of the outer shell 52c whereas the generally loose braiding of the second portions 122c helps to permit radial expansion of the outer shell.

The inflatable tubular structure 14c, when inflated, helps to protect a vehicle occupant in the event of a vehicle rollover or a side impact to the vehicle 12c. The inflatable tubular structure 14c, when inflated, helps to absorb the energy of impacts with the tubular structure and helps to distribute the impact energy over a large area of the tubular structure. When the inflatable tubular structure 14c is in the inflated and deployed condition illustrated in FIG. 12, the second portions 122c may be positioned adjacent the vehicle side structure 16c at a location where an occupant's head is likely to strike the side structure in the event of a side impact or vehicle rollover.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle, said apparatus comprising:

an inflatable tubular structure that is inflatable into a position adjacent a vehicle occupant; and an inflation fluid source that provides inflation fluid for inflating said inflatable tubular structure, said inflatable tubular structure comprising an inflatable bladder and a tubular outer shell that surrounds said inflatable bladder, said outer shell having a length and a diameter and including a plurality of slits that extend longitudinally along said outer shell in a direction generally parallel to said length of said outer shell, said diameter of said outer shell increasing and said length of said outer shell decreasing when said inflatable bladder is inflated.

2. Apparatus as defined in claim 1, wherein each of said slits defines portions of said outer shell positioned on opposite sides of said each of said slits, said portions of said outer shell being positioned adjacent to each other when said inflatable tubular structure is in a deflated condition, said portions of said outer shell moving away from each other when said inflatable tubular structure is inflated so as to increase said diameter of said outer shell.

3. Apparatus as defined in claim 2, wherein portions of said outer shell positioned between end portions of adjacent slits are spaced apart when said inflatable tubular structure is in said deflated condition, said portions between said end portions moving towards each other when said inflatable tubular structure is inflated so as to decrease said length of said outer shell.

4. Apparatus as defined in claim 1, wherein said slits include a plurality of first slits having a first length positioned along at least one first portion of said outer shell, and a plurality of second slits having a second length greater than said first length positioned along at least one second portion of said outer shell, said at least one first portion of said outer shell expanding to a first diameter when said inflatable tubular structure is inflated, said at least one second portion of said outer shell expanding to a second diameter, greater than said first diameter, when said inflatable tubular structure is inflated.

5. Apparatus as defined in claim 4, wherein said inflatable tubular structure includes at least one third portion, said third portion being free from slits and having a diameter when said inflatable tubular structure is deflated that is generally equal to the diameter of said third portion when said inflatable tubular structure is inflated.

6. Apparatus as defined in claim 1, wherein said outer shell includes at least one first portion having a given number of slits per unit area, said first portion of said outer shell expanding to a first diameter when said inflatable tubular structure is inflated, said outer shell including at least one second portion having a number of slits per unit area greater than said given number of slits, said second portion of said outer shell expanding to a second diameter, greater than said first diameter, when said inflatable tubular structure is inflated, each of said slits in said first portion being generally equal in length to each of said slits in said second portion.

7. Apparatus as defined in claim 1, wherein said slits are arranged in a plurality of parallel rows that extend along the length of said outer shell, said slits in any given row having positions along the length of said outer shell that are offset with respect to the positions along the length of said outer shell of the slits in the rows adjacent said any given row.

8. Apparatus as defined in claim 2, further including connections that comprise portions of said outer shell extending across said slits and connecting said portions of said outer shell positioned on opposite sides of said slits, said connections extending across said slits breaking when said inflatable tubular structure is inflated to allow said portions of said outer shell positioned on opposite sides of said slits to move away from each other when said inflatable tubular structure is inflated.

9. Apparatus as defined in claim 1 wherein said outer shell is constructed of a single piece of homogeneous material.

10. Apparatus as defined in claim 9, wherein said material is plastic.

11. Apparatus as defined in claim 1, wherein said inflatable tubular structure is inflatable away from a roof of the vehicle into a position between a side structure of the vehicle and a vehicle occupant.

12. Apparatus as defined in claim 10, wherein a portion of said inflatable tubular structure, when inflated, is positioned adjacent the vehicle side structure at a location where an occupant's head is likely to strike the vehicle side structure in the event of at least one of a side impact and a vehicle rollover.

13. Apparatus as defined in claim 11, wherein said inflatable tubular structure has a stored position extending along the side structure adjacent a roof of the vehicle, said inflatable tubular structure being inflated away from the vehicle roof into said position between the side structure of the vehicle and a vehicle occupant.

14. Apparatus as defined in claim 11, wherein said inflatable tubular structure, when inflated, extends along the side structure of the vehicle between an A pillar and a C pillar of the vehicle.

15. Apparatus as defined in claim 11, wherein said inflatable tubular structure, when inflated, overlies at least a portion of an A pillar, a B pillar and a C pillar of the vehicle.

16. Apparatus as defined in claim 1, further comprising a sensor for sensing a vehicle condition for which deployment of said inflatable tubular structure is desired, said sensor actuating said inflation fluid source to provide inflation fluid to inflate said inflatable tubular structure.

17. Apparatus as defined in claim 1, wherein said inflation fluid source comprises an inflator which is actuatable to inflate said inflatable tubular structure.

18. Apparatus for helping to protect an occupant of a vehicle, said apparatus comprising:

an inflatable tubular structure that is inflatable into a position adjacent a vehicle occupant; and an inflation fluid source that provides inflation fluid for inflating said inflatable tubular structure, said inflatable tubular structure comprising an inflatable bladder and a tubular outer shell that surrounds said inflatable bladder, said outer shell being constructed of a braided material and including at least one first portion and at least one second portion, said braided material of said at least one first portion being more tightly braided than said braided material of said at least one second portion, said first portion having a first diameter when said inflatable tubular structure is inflated, and said second portion having a second diameter, greater than said first diameter, when said inflatable tubular structure is inflated.

19. Apparatus as defined in claim 18, wherein said outer shell has a length that decreases when said inflatable bladder is inflated.

20. Apparatus as defined in claim 18, wherein said inflatable tubular structure is inflatable away from a roof of the vehicle into a position between a side structure of the vehicle and a vehicle occupant.

21. Apparatus as defined in claim 20, wherein a portion of said inflatable tubular structure, when inflated, is positioned adjacent the vehicle side structure at a location where an occupant's head is likely to strike the vehicle side structure in the event of at least one of a side impact and a vehicle rollover.

22. Apparatus as defined in claim 20, wherein said inflatable tubular structure has a stored position extending along the side structure adjacent a roof of the vehicle, said inflatable tubular structure being inflated away from the vehicle roof into said position between the side structure of the vehicle and a vehicle occupant.

23. Apparatus as defined in claim 20, wherein said inflatable tubular structure, when inflated, extends along the side structure of the vehicle between an A pillar and a C pillar of the vehicle.

24. Apparatus as defined in claim 20, wherein said inflatable tubular structure, when inflated, overlies at least a portion of an A pillar, a B pillar and a C pillar of the vehicle.

* * * * *